J. A. WARD.
SELF LOADING AND DUMPING AUTO TRUCK.
APPLICATION FILED APR. 9, 1917.

1,256,401.

Patented Feb. 12, 1918.
6 SHEETS—SHEET 1.

WITNESSES

INVENTOR
J. A. Ward
BY
ATTORNEYS

J. A. WARD.
SELF LOADING AND DUMPING AUTO TRUCK.
APPLICATION FILED APR. 9, 1917.

1,256,401.

Patented Feb. 12, 1918.
6 SHEETS—SHEET 3.

WITNESSES
Oliver W. Holmes
Geo. G. Hosford

INVENTOR
John A. Ward
BY Munn & Co.
ATTORNEYS

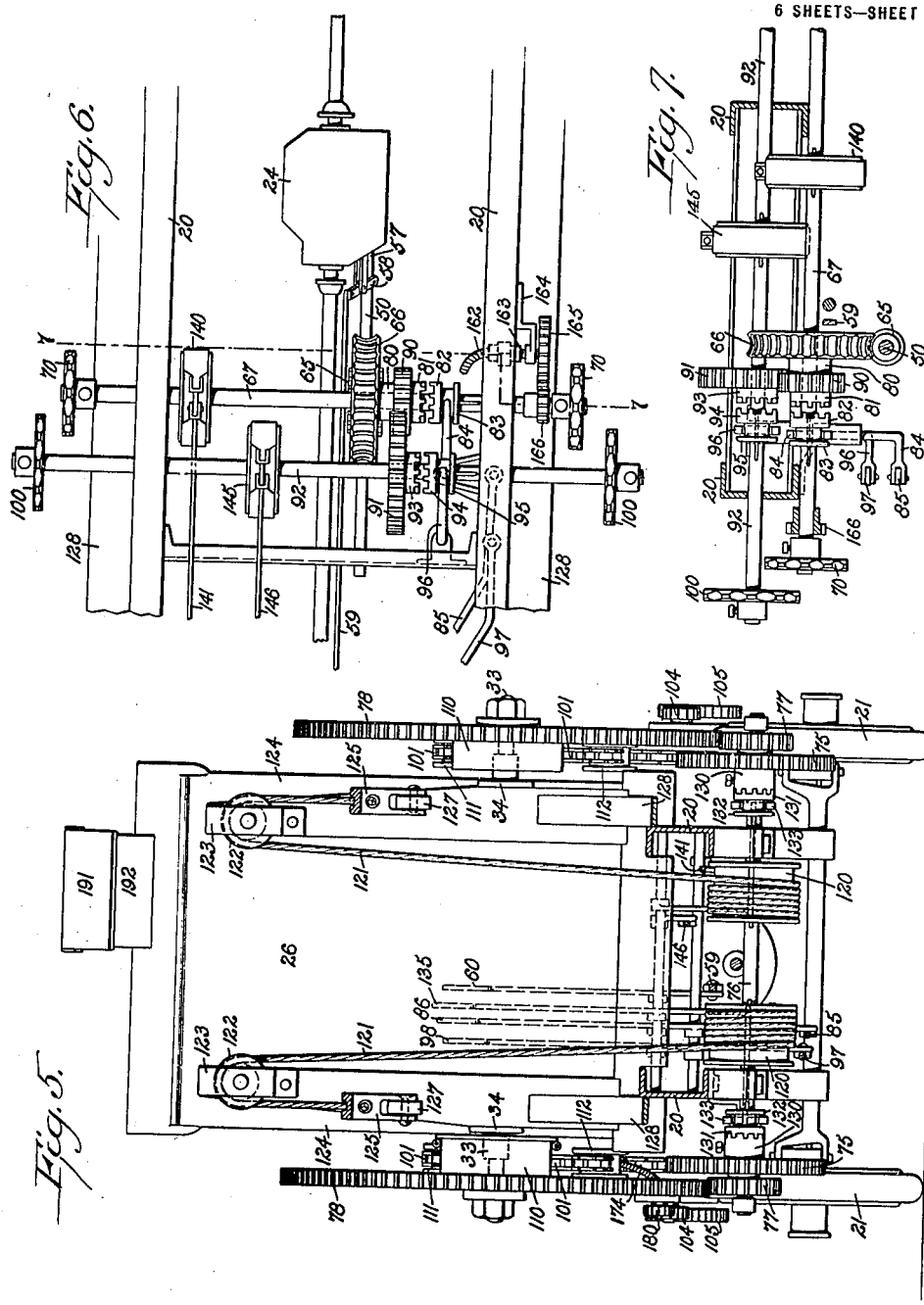

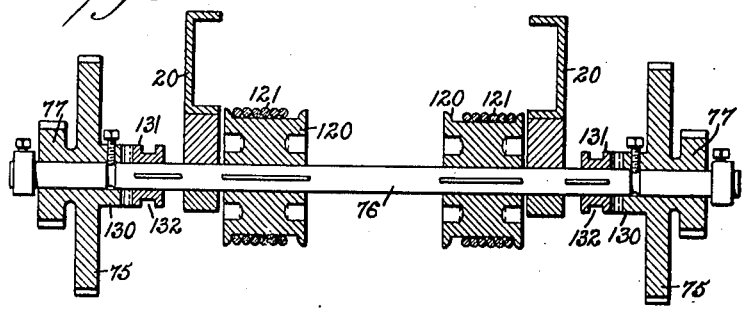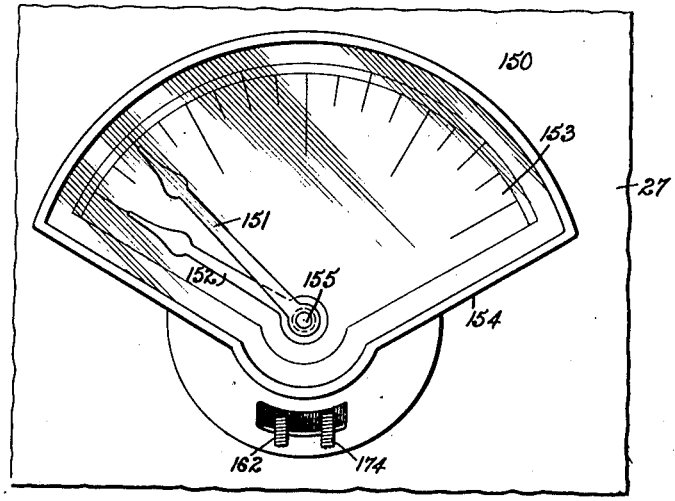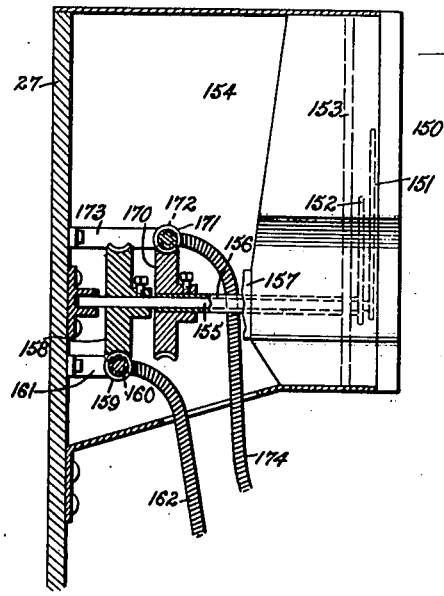

J. A. WARD.
SELF LOADING AND DUMPING AUTO TRUCK.
APPLICATION FILED APR. 9, 1917.

1,256,401. Patented Feb. 12, 1918.
6 SHEETS—SHEET 6.

WITNESSES

INVENTOR
John A. Ward
BY
ATTORNEYS

UNITED STATES PATENT OFFICE.

JOHN A. WARD, OF PHILADELPHIA, PENNSYLVANIA.

SELF LOADING AND DUMPING AUTO-TRUCK.

1,256,401.  Specification of Letters Patent.  Patented Feb. 12, 1918.

Application filed April 9, 1917. Serial No. 160,831.

*To all whom it may concern:*

Be it known that I, JOHN A. WARD, a citizen of the United States, and a resident of Philadelphia, in the county of Philadelphia and State of Pennsylvania, have invented a new and Improved Self Loading and Dumping Auto-Truck, of which the following is a full, clear, and exact description.

The invention relates to machines for removing the loose material incident in making excavations, in digging canals and ditches, in grading roadways, building subways, or in removing snow or street sweepings from streets.

The object of the invention is to provide a new and improved self loading and dumping auto-truck completely under the control of a single operator and arranged to permit of running the truck about from the place of loading to the place of dumping the load and to manipulate the operating mechanism for a shovel or a scoop and the wagon body to scoop loose materials while driving the truck forward and to carry the material overhead and dump it into the wagon body to gradually fill the latter by repeated dumping operations of the shovel or scoop. Another object is to permit of running the truck to a place of discharge, to swing the filled wagon body upwardly and rearwardly into inclined dumping position to discharge the load.

In order to accomplish the desired result, use is made of a motor driven truck, a wagon body mounted to swing on the truck from normal horizontal or loading position into inclined or dumping position and vice versa, carrying arms mounted to swing up and down on the truck, and a shovel or scoop mounted to turn on the said arms and adapted to scoop up the material in front of the truck and to carry it overhead in a rearward direction to finally dump it into the wagon body at the time the latter is in horizontal loading position. Use is also made of indicating means, visible to the operator in charge of the truck, to indicate at any time the positions of the scoop, its carrying arms, and the wagon body.

A practical embodiment of the invention is represented in the accompanying drawings forming a part of this specification, in which similar characters of reference indicate corresponding parts in all the views.

Fig. 3 is a plan view of the same with the wagon body and driver's seat removed and parts broken out;

Fig. 4 is an enlarged sectional plan view of one side of the mechanism for turning the shovel or scoop on its carrying arms;

Fig. 5 is an enlarged cross section of the self-loading and dumping auto-truck on the line 5—5 of Fig. 2;

Fig. 6 is an enlarged plan view of the gearing for the mechanism connected with the scoop, the carrying arms and the wagon body, and driven from the transmission gear connecting the motor with the rear axle of the truck;

Fig. 7 is a transverse section of the same on the line 7—7 of Fig. 6;

Fig. 8 is an enlarged cross section of the drum shaft and the parts carried thereby, the section being on the line 8—8 of Fig. 2;

Fig. 9 is an enlarged face view of the indicator for indicating the position of the scoop and that of its carrying arms.

Fig. 10 is a sectional side elevation of the same with parts in elevation;

Figure 1:
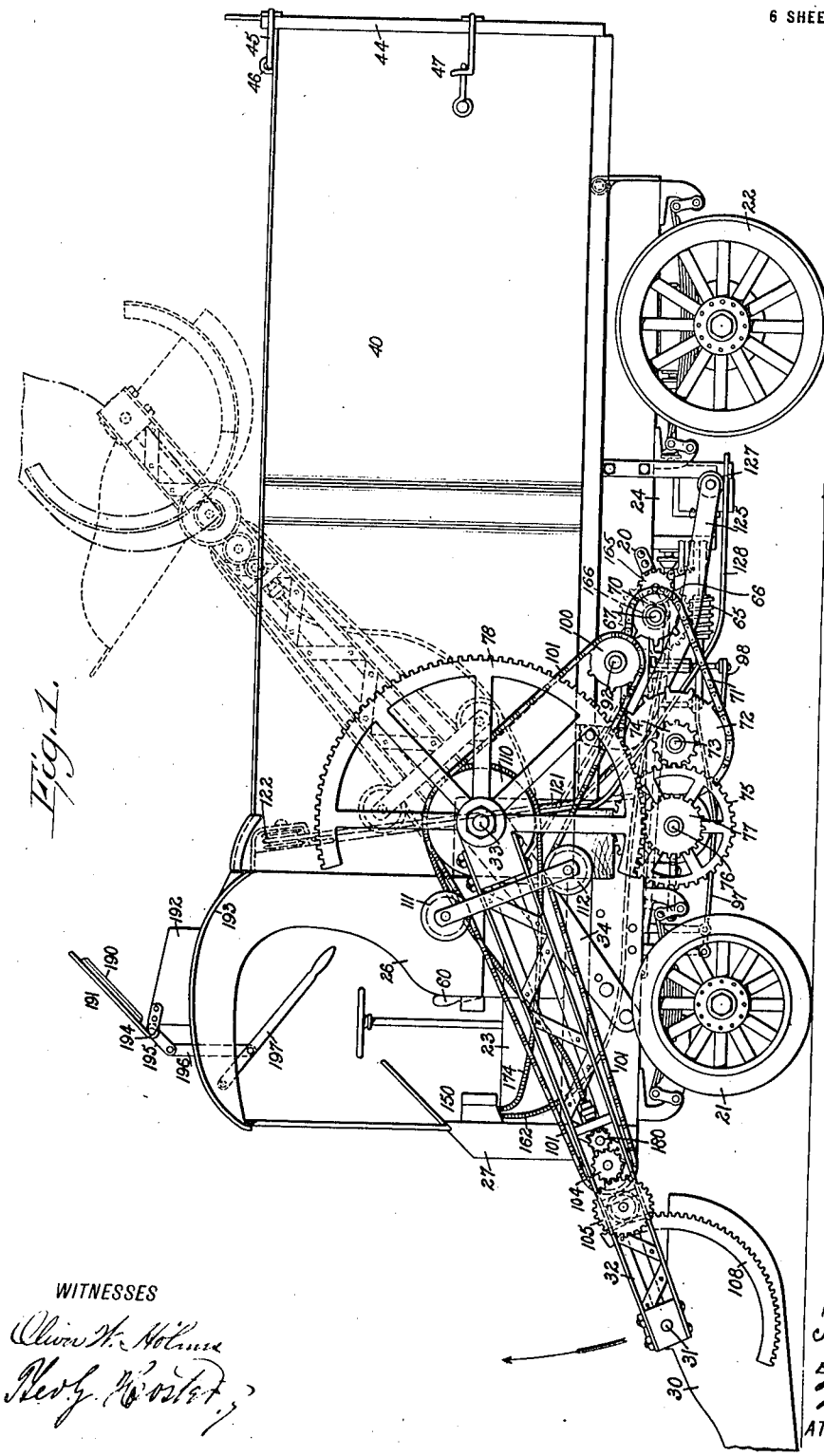
Figure 1 is a side elevation of the self loading and dumping auto-truck.

In the general construction of the self-loading and dumping auto-truck use is made of an auto-truck including a framework 20, front or steering wheels 21, rear or driving wheels 22, and a gasolene or other motor 23 connected by the usual transmission gear 24 with the axle 25 of the rear wheels 22. Various devices, such as electric starting and controlling devices for the motor 23, steering mechanism for the front wheels and actuating devices for the brake mechanisms of the truck are located on the framework 20 in front of the driver's seat 26, mounted in the usual manner on the framework 20. Other accessories (not shown) such as are usually found on auto-trucks of this type are mounted on the dashboard 27.

A scoop or shovel 30 is provided at its sides with trunnions 31 journaled in the free ends of carrying arms 32 arranged on opposite sides of the truck and mounted to swing on studs 33 carried by brackets 34 attached to and forming part of the framework 20. The studs 33 are located in the rear of the driver's seat 26 a distance above the framework 20, and the carrying arms 32 are of such length that the scoop 30 in one position of the said arms (see Figs. 1, 2 and 3) extends in front of the truck with the forward end of the scoop downward close to the ground to scoop up loose material on propelling the truck forward by corresponding use of its motor 23. After the scoop 30 is filled a rearward and upward swinging motion is given to the carrying arms 32 to carry the filled scoop 30 upward and rearward overhead of the seat 26 to finally dump the material into a wagon body 40 normally resting on the rear portion of the framework 20, as plainly shown in Fig. 1. During the upward and rearward swinging movement given to the side arms 32 the scoop 30 is maintained in an approximately horizontal position to prevent the material therein from falling out, and when the arms 32 reach a rearmost position, as indicated in dotted lines in Fig. 1, then the scoop 30 is turned to dump the contents thereof into the wagon body 40. The bottom 41 of the wagon body 40 is provided near its rear end with a transverse pivot 42 engaging bearings 43 attached to the rear end of the framework 20 to permit of swinging the wagon body 40 upwardly and rearwardly into dumping position, as shown in Fig. 2 and hereinafter more fully described. The rear end of the wagon body 40 is provided with a back gate 44 provided at its upper end with forwardly extending arms 45 mounted to swing in bearings 46 attached to the top of the sides of the wagon body near the rear end thereof. A suitable locking device 47 serves to normally hold the gate 44 in closed position on the rear end of the wagon body 40, but when it is desired to dump the contents of the wagon body the locking device 47 is unlocked to allow the gate 44 to swing into open position at the time the wagon body is in the dumping position illustrated in Fig. 2.

Figure 11:
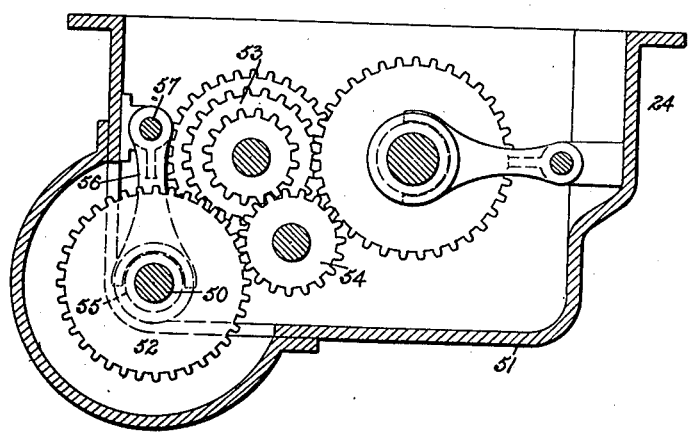
Fig. 11 is an enlarged cross section of the speed changing gear mechanism.
Figure 12:
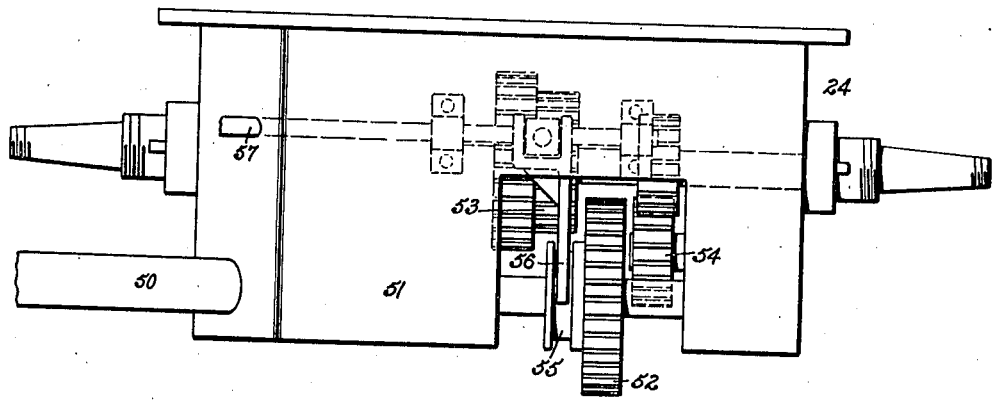
Fig. 12 is a side elevation of the same.

In order to impart movement to the scoop 30, the carrying arms 32 and the wagon body 40, use is made of independent mechanisms all under the control of the attendant in charge of the machine and all driven from the speed changing gear 24 of the motor 23. For the purpose mentioned use is made of a worm shaft 50 extending longitudinally and journaled in the gear casing 51 of the speed changing gear 24, as plainly indicated in Figs. 11 and 12. A gear wheel 52 is mounted to slide on and to turn with the worm shaft 50 within the gear casing 51 and the said gear wheel 52 is adapted to mesh with either the low speed gear wheel 53 or the reversing gear wheel 54 to permit of driving the worm shaft 50 in either direction. The gear wheel 52 is provided with a shifting collar 55 engaged by a shifting fork 56 attached to a rod 57 mounted to slide in suitable bearings on the casing 51 and connected at its forward end outside of the casing 51 with a lever 58 fulcrumed on the casing 51. The lever 58 is connected by a link 59 with an operating lever 60 (see Fig. 2) fulcrumed at 61 on the framework 20 and extending within convenient reach of the attendant in charge of the machine and seated on the seat 26. By the attendant manipulating the lever 60, the gear wheel 52 can be shifted to mesh with either the gear wheel 53 or the reversing gear wheel 54 to rotate the worm shaft 50 in either a forward or a reverse direction.

On the worm shaft 50 is secured a worm 65 in mesh with a worm wheel 66 mounted to rotate loosely on a transverse shaft 67 journaled in suitable bearings in the framework 20. On the outer ends of the shaft 67 are secured sprocket wheels 70 connected by sprocket chains 71 with sprocket wheels 72 secured on a transverse shaft 73 journaled in suitable bearings arranged on the framework 20. On the outer ends of the shaft 73 are secured pinions 74 in mesh with gear wheels 75 mounted to rotate loosely on a transverse shaft 76 journaled in suitable bearings arranged on the framework 20. On the gear wheels 75 are secured pinions 77 (see Figs. 1 and 8) in mesh with segmental gear wheels 78 secured to the carrying arms 32 for imparting a swinging motion to the latter, as hereinafter more fully explained.

In order to drive the shaft 67 from the worm wheel 66 the following arrangement is made, special reference being had to Figs. 3, 6 and 7. On the hub 80 of the worm wheel 66 is formed a clutch member 81 adapted to be engaged by a clutch member 82 mounted to slide on and to turn with the shaft 67. The clutch member 82 is provided with a clutch collar 83 engaged by a bell crank shifting lever 84 fulcrumed on the framework 20 and connected by a forwardly extending link 85 with a lever 86 fulcrumed at 87 on the framework 20 and extending within convenient reach of the attendant seated on the seat 26 (see Fig. 2). Thus when the attendant manipulates the lever 86 the clutch 82 can be moved into or out of engagement with the clutch member 81. When the clutch members 82 and 81 are in engagement then the rotary motion of the worm wheel 85 is transmitted to the shaft 67 which by the sprocket wheels 70 and 72, the sprocket chains 71, the pinions 74, the gear wheels 75, the pinions 77 and the segmental gear wheels 78 causes a swinging movement to be given to the carrying arms 32 either in an upward and rearward direction or in a forward and downward direction according to the direction in which the worm wheel 66 is driven at the time from the shaft 50.

In order to impart a turning motion to the scoop 30, the following arrangement is made: On the hub 80 of the worm wheel 66 is secured a pinion 90 in mesh with a gear wheel 91 mounted to rotate loosely on a transverse shaft 92 journaled in suitable bearings arranged on the framework 20. On the gear wheel 91 is formed or secured a clutch member 93 adapted to be engaged by a clutch member 94 mounted to slide and to turn with the shaft 92. The clutch member 94 is provided with a shifting collar 95 engaged by a bell crank shifting lever 96 connected by a forwardly extending link 97 with a lever 98 fulcrumed at 99 on the framework 20 and extending within convenient reach of the attendant in charge of the machine and seated on the seat 26. On the attendant manipulating the lever 98 the clutch member 94 can be shifted into engagement with the clutch member 93 to rotate the shaft 92 in either direction from the worm wheel 66 driven in either direction from the shaft 50, as previously explained. On the outer ends of the shaft 92 are secured sprocket wheels 100 connected by sprocket chains 101 with sprocket wheels 102 secured on shafts 103 (see Figs. 3 and 4), journaled in suitable bearings arranged near the forward ends of the carrying arms 32. On the shafts 103 are secured pinions 104 in mesh with gear wheels 105 secured on shafts 106 journaled in the carrying arms 32. On the inner ends of the shafts 106 are secured pinions 107 in mesh with segmental gear wheels 108 attached to the outer faces of the sides of the scoop 30. When the shaft 92 is rotated in one direction then a swinging movement is given by the gearing just described to the scoop 30 in one direction and when the shaft 92 rotates in a reverse direction then a correspondingly reverse swinging movement is given to the scoop 30.

In order to keep each sprocket chain 101 taut, the upper run of the sprocket chain passes around a guide pulley 110 attached to or forming part of the corresponding segmental gear wheel 78. The upper run next passes under a guide pulley 111 mounted on the corresponding arm 32, and the lower run of each sprocket chain 101 passes over a guide pulley 112 mounted on the corresponding carrying arm 32, as will be readily understood by reference to Fig. 1.

In order to impart an upward and rearward swinging movement to the wagon body 40 for dumping the load thereof, as previously mentioned, the following arrangement is made: On the shaft 76 previously mentioned are secured drums 120 on which wind and unwind ropes, cables or similar flexible connections 121 extending upwardly over guide pulleys 122 journaled in bearings 123 attached to the upper ends of inclined guide blocks 124 erected on the framework 20 immediately in the rear of the driver's seat 26. The flexible connections 121 after leaving the guide pulleys 122 are attached to arms 125 pivoted at 126 to the under side of the bottom 41 of the wagon body 40 near the forward end thereof. The free ends of the arms 125 are provided with friction rollers 127 adapted to travel on the guideways 124 and on extensions 128 therefor and extending rearwardly as plainly shown in Figs. 2 and 3. The shaft 76 is adapted to be driven from the gear wheels 75 and for this purpose the latter are provided with clutch members 130 (see Figs. 3 and 8) adapted to be engaged by clutch members 131 mounted to slide on and to turn with the shaft 76. The clutch members 131 are provided with shifting collars 132 engaged by bell crank shifting levers 133 fulcrumed on the framework 20 and connected by links 134 with a shifting lever 135 fulcrumed at 136 on the framework 20 and extending within convenient reach of the attendant in charge of the machine and seated on the seat 26 (see Fig. 2). When the gear wheels 75 are driven, as previously explained, and the carrying arms 32 swing downwardly and forwardly after having dumped the last load of the scoop into the wagon body 40, and the machine is run to the place of dumping then the attendant shifts the lever 135 to engage the clutch members 131 with the clutch members 130 to rotate the shaft 76 and consequently the drums 120. The rotary motion of the drums 120 causes the winding up of the flexible connections 121 whereby an upward pull is exerted on the arms 125 to cause the friction rollers 127 thereof to travel upwardly and forwardly on the extension guideways 128 and finally on the guideways 124 to impart an upward and rearward swinging movement to the wagon body 40 while the arms 32 swing downwardly and forwardly. It is understood that the scoop is out of the way of the forward end of the wagon body 40 when the latter swings upwardly and rearwardly as above explained.

On the shaft 67 is secured a brake 140 of any approved construction and connected by a link 141 with the lever 86 (see Figs. 2 and 3) to enable the attendant to brake the shaft 67 at the time the clutch member 82 is thrown out of engagement with the clutch member 81. A similar brake 145 is mounted on the shaft 92 and its brake band is connected by a link 146 with the lever 98 so that when the latter is actuated and the clutch member 94 is moved out of mesh with the clutch member 93 then the brake 145 is applied to hold the shaft 92 against accidental turning.

To enable the attendant to properly manipulate the lever 86 controlling the swinging movement of the carrying arms 32, and the lever 98 controlling the turning movement of the scoop 30 on the said carrying arms 32, use is made of an indicator 150 mounted on the back of the dashboard 27 in front of the attendant and visible to the latter. The indicator 150 is provided with two pointers or hands 151 and 152 indicating on a dial 153 mounted in a casing 154 attached to the dashboard 27. The pointer 151 is secured on a shaft 155 mounted to turn in a sleeve 156 carrying the pointer 152, and the said sleeve 156 is journaled in a suitable bearing 157 arranged in the casing 154, as plainly shown in Fig. 10, see also Fig. 9. On the shaft 155 is secured a worm wheel 158 in mesh with a worm 159 secured on the forward end of a shaft 160 mounted to turn in a suitable bearing 161 attached to the dashboard 27. The shaft 160 is connected with the forward end of a flexible shaft 162 extending rearwardly and connected with a shaft 163 journaled in a suitable bearing 164 attached to the framework 20. On the shaft 163 is secured a gear wheel 165 in mesh with a gear wheel 166 secured on the shaft 67. When the shaft 67 is rotated in a forward direction then the pointer 151 swings from normal zero position to the right thus indicating the position of the carrying arms during their upward and rearward swinging movement, and when the shaft 67 is rotated in a reverse direction then the pointer 151 swings back toward zero position, which latter is reached at the time the carrying arms 32 are in lowermost forward position.

The sleeve 156 carrying the pointer 152 is provided at its forward end with a worm wheel 170 in mesh with a worm 171 secured on a shaft 172 journaled in a suitable bearing 173 attached to the dashboard 27, as plainly shown in Fig. 10. The forward end of a flexible shaft 174 is coupled to the shaft 172 and this flexible shaft 174 extends rearwardly and passes loosely around the guide pulley 110 to then extend forwardly to connect at its forward end with a shaft 175 journaled in a bearing 176 attached to one of the carrying arms 32, preferably the one on the left-hand side of the machine (see Fig. 4). On the shaft 175 is secured a bevel gear wheel 177 in mesh with a similar gear wheel 178 attached to a shaft 179 mounted in a suitable bearing fastened to the carrying arm 32 mentioned. On the shaft 179 is secured a gear wheel 180 in mesh with the pinion 104 previously mentioned, so that when said gear wheel 104 is rotated in one direction then the pointer 152 is caused to swing from normal zero position to the right to indicate the position of the shovel 30, and when the pinion 104 is turned in an opposite direction then the pointer 152 is caused to swing from the right to the left toward zero position. It will be understood that by the arrangement described the attendant by watching the pointers 151, 152 can at any time notice the position of the carrying arms 32, that of the scoop 30, and the wagon body 10. The pointers 151 and 152 are capable of moving through an area of about 130° during a full swinging motion of the scoop from one extreme point to the other, and of the arms from lowermost to uppermost position or vice versa. It is understood that the gearing above described for actuating the pointers is proportioned to produce the desired movement of the pointers. It is also understood that the position of the pointer 151 also discloses the position of the wagon body when the latter is moved into dumping position owing to the rotation of the shaft 67 geared with the pointer 151 and with the mechanism for actuating the body.

In order to enable the attendant to see the distribution of the material in the wagon body by the scoop 30 and also to see the position of the wagon body 40 when the latter moves into dumping position, use is made of a mirror or similar reflecting surface 190 attached to the under side or cover 191 closing the tubular top 192 of the hood 193 of the seat 26. The cover 191 is pivoted at 194 and is provided with an arm 195 connected by a link 196 with a lever 197 extending above the attendant's head and within convenient reach of the attendant to permit the latter to swing the lever 197 downward with a view to swing the cover 191 upward into an angular position and with it the mirror 190. It will be noticed that when the mirror is in this angular position, the attendant on looking at the mirror readily sees the reflected images of the scoop 30 when in upward and rearward position as well as the position of the wagon body 40. By the arrangement described the attendant can readily guide himself in the manipulation of the levers 96 and 98 to cause the scoop to dump its load farther rearward or farther front in the wagon body 40. The attendant can also readily guide himself in the manipulation of the lever 135 to gage the dumping position of the wagon body 40.

The operation is as follows:—

Figure 2:
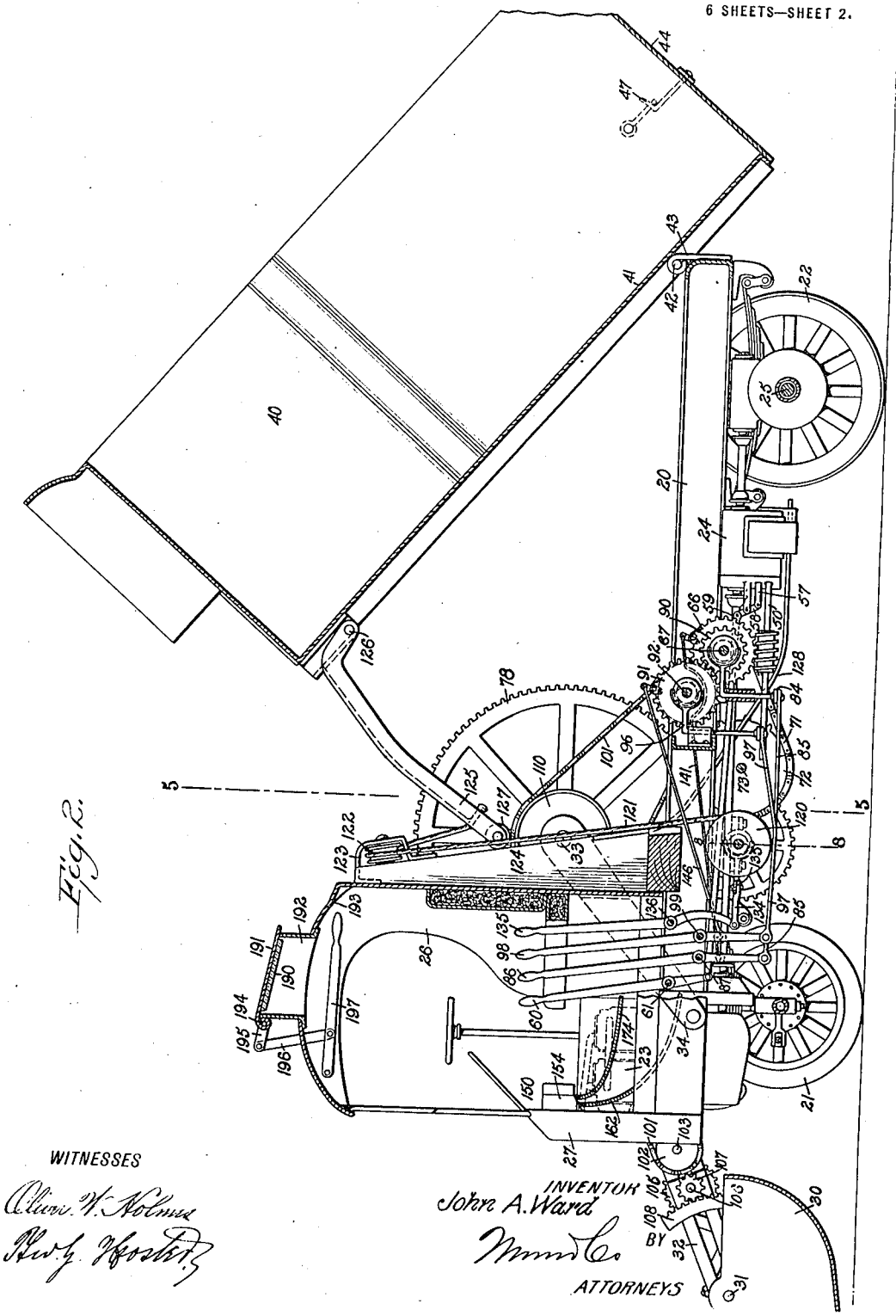
Fig. 2 is a sectional side elevation of the same with the body in raised position ready for dumping its load.

When the parts are in position, as shown in Figs. 1, 2 and 3, and the auto-truck is propelled forward then the scoop 30 scoops up the loose material in front of the scoop, and when the scoop 30 is filled the attendant in charge stops the forward movement of the truck without, however, stopping the motor by correspondingly throwing the speed changing gear into neutral position. The operator now actuates the lever 60 to connect the gear wheel 52 with the gear wheel 53 to drive the shaft 50 from the motor 23. The rotary motion of the shaft 50 is transmitted to the worm wheel 66 and the operator now actuates the lever 86 whereby the clutch member 81 and the shaft 67 is now rotated from the driven worm wheel 66. The rotary motion of the shaft 67 is transmitted by the sprocket transmission 70, 71, 72 and the gearings 74, 75, 77 and 78 to the carrying arms 32 to swing the latter upwardly and rearwardly and with them the filled scoop 30. In order to maintain the filled scoop 30 in an approximately horizontal position during the upward and rearward swinging movement of the carrying arms 32, the attendant manipulates the lever 18 to connect the clutch member 94 with the clutch member 93 whereby the gear wheel 91 driven from the pinion 90 causes the rotation of the shaft 92 which by the sprocket connection 100, 101, 102 and the gearing 104, 105, 107 and 108 causes the scoop 30 to turn on its trunnions 31. The positions of the arms 32 and the scoop 30 are indicated by the pointers 151 and 152 to enable the attendant to temporarily stop the movement of either the carrying arms 32 or the scoop 30, if deemed necessary. Usually, however, the upward and rearward swinging movement proceeds uninterruptedly until the carrying arms reach the position indicated in dotted lines in Fig. 2, and when this position is reached the attendant manipulates the lever 86 to disconnect the clutch member 82 from the clutch member 81 while the clutch member 94 remains in engagement with its clutch member 93 and consequently the carrying arms 32 remain stationary for the time being while a further turning may be given to the scoop 30 to move the latter into dumping position and thereby discharge its load into the wagon body 40. In order to do this the lever 60 is reversed, to disconnect the gear wheel 52 from the gear wheel 53 and to connect it with the reversing gear wheel 54 so that the shaft 50 and the worm wheel 66 are rotated in a reverse direction. The brake 145 is also applied to hold the scoop locked in its dumping position which is also its loading position, shown in Fig. 1. The operator now actuates the lever 86 to again throw the clutch member 82 into engagement with the clutch member 81 to cause the connecting mechanism for the arms 32 to swing the latter forwardly and downwardly. The carrying arms finally reach the normal lowermost position with the scoop 30 tilted to scoop up another load on moving the truck a corresponding distance forward and then the above described operation is repeated to cause the arms 32 to swing upward and rearward and finally to tilt the scoop 30 for the latter to discharge its second load into the wagon body 40. This operation is repeated as many times as desired or until the wagon body 40 is filled. It is understood that the attendant by watching the positions of the pointers 151 and 152 or viewing the position of the carrying arms 32 when in upward rearmost position can readily stop the carrying arms during their upward and rearward movement at any desired position to dump the loads farther rearward or farther forward in the wagon body 40 to evenly fill the latter. After the wagon body 40 is filled the attendant actuates the lever 60 and throws the gear wheel 52 into neutral position. The auto-truck is now run to the place of dumping and then the lever 60 is actuated to throw the gear wheel 52 into engagement with the gear wheel 56 to again rotate the shaft 50 and the worm wheel 66 as previously explained, and the attendant also manipulates the lever 86 to throw the clutch member 82 in engagement with the clutch member 81. The operator then actuates the lever 135 to connect the clutch members 131 with the clutch members 130 to rotate the shaft 76. The rotary motion given to the shaft 76 causes the drums 120 to wind up the flexible connections 121 whereby a forward and upward pull is exerted on the arms 125 to swing the wagon body 40 upwardly and rearwardly into dumping position, as indicated in Fig. 2, to allow the contents of the wagon body 40 to slide out of the same, it being understood that the gate 44 was opened on reaching the place of dumping. After the load of the wagon body 40 has been discharged the attendant manipulates the lever 60 to reverse the shaft 50 and the worm wheel 66 with a view to rotate the drum shaft 76 in a reverse direction to unwind the flexible connections 121. The wagon body 40 by its own weight now gradually swings downward back to normal horizontal position on top of the framework 20, and when this position is reached the lever 60 is manipulated to move the gear wheel 52 into inactive position to stop the rotation of the drum shaft 76 and the various mechanisms connected therewith.

From the foregoing it will be seen that a single attendant has complete control of the various mechanisms to propel the auto-truck to cause loose material to be scooped up and deposited in the wagon body 40, and when the latter is filled to allow of running the truck to a place of discharge, at which the contents of the wagon body are dumped. Practically no manual labor except the manipulation of the levers as above mentioned is required on the part of the attendant to accomplish the desired result, and a large amount of material can be scooped up and deposited in the wagon body 40 in a comparatively short time thus rendering the use of the machine exceedingly economical.

Having thus described my invention, I claim as new and desire to secure by Letters Patent:—

1. In a self-loading and dumping auto-truck, the combination of a power-driven truck, a wagon body mounted to swing on the rear portion of the said truck from normal loading position into dumping position and vice versa, a scoop adapted to scoop up the material in front of the truck, carrying arms mounted to swing up and down on the truck and on which the said scoop is mounted to swing the latter upward and rearward into dumping position relative to the said wagon body, the said carring arms extending outside of the sides of the wagon body to allow the carrying arms to swing rearwardly beyond a vertical position to dump the contents of the scoop evenly in the wagon body, power-driven actuating mechanisms mounted on the truck and connected with the said wagon body, the said scoop and the said carrying arms, and controlling mechanisms under the control of the operator in charge of the truck and connected with the said actuating mechanisms to control the latter to cause the scoop to scoop up the material, to carry it overhead rearward to turn the scoop during this overhead rearward movement thereby maintaining the scoop in an approximately horizontal position, to turn the scoop in a reverse direction into dumping position relative to the wagon body and to swing the latter into dumping position to discharge its load, the said dumping position of the scoop corresponding to its scooping up position.

2. In a self-loading and dumping auto-truck, the combination of a power driven truck, a wagon body mounted to swing on the rear portion of the said truck from normal loading position into dumping position or vice versa, a scoop adapted to scoop up the material in front of the truck, carrying arms mounted to swing up and down on the truck in planes outside of the sides of the said wagon body, the said scoop being mounted to swing on the free ends of the carrying arms, a power driven actuating mechanism connected with the said carrying arms to impart a swinging motion to the said carrying arms to swing the same from forward scooping position upward and rearward beyond a vertical position and back to forward scooping position, and a power driven actuating mechanism mounted on the said truck and connected with the said scoop to impart a swinging motion to the latter in one direction during the upward and rearward movement of the carrying arms to maintain the scoop in an approximately horizontal position and to turn the scoop in a reverse direction into dumping position to dump its contents into the wagon body and in any position the carrying arms may be in at the time to distribute the contents of the scoop during repeated operations evenly in the wagon body.

3. In a self-loading and dumping auto-truck, the combination of a power driven truck, a wagon body mounted to swing on the rear portion of the said truck from normal loading position into dumping position or vice versa, a scoop adapted to scoop up the material in front of the truck, carrying arms mounted to swing up and down on the truck in planes outside of the sides of the said wagon body, the said scoop being mounted to swing on the free ends of the said carrying arms, a power driven actuating mechanism connected with the said carrying arms to impart a swinging motion to the said carrying arms to swing the same from forward scooping position upward and rearward beyond a vertical position and back to forward scooping position, a power driven actuating mechanism mounted on the said truck and connected with the said scoop to impart a swinging motion to the latter in one direction during the upward and rearward movement of the carrying arms to maintain the scoop in an approximately horizontal position and to turn the scoop in a reverse direction into dumping position to dump its contents into the wagon body and in any position the carrying arms may be in at the time to distribute the contents of the scoop during repeated operations evenly in the wagon body, a motor for propelling the truck and provided with a transmission gear, and connections between the said transmission gear and the said power driven actuating devices to actuate the latter.

4. In a self-loading and dumping auto-truck, the combination of a power driven truck, a wagon body mounted to swing on the rear portion of the said truck from normal loading position into dumping position or vice versa, a scoop adapted to scoop up the material in front of the truck, carrying arms mounted to swing up and down on the truck in planes outside of the sides of the said wagon body, the said scoop being mounted to swing on the free ends of the carrying arms, a power driven actuating mechanism connected with the said carrying arms to impart a swinging motion to the said carrying arms to swing the same from forward scooping position upward and rearward beyond a vertical position and back to forward scooping position, a power driven actuating mechanism mounted on the said truck and connected with the said scoop to impart a swinging motion to the latter in one direction during the upward and rearward movement of the carrying arms to maintain the scoop in an approximately horizontal position and to turn the scoop in a reverse direction into dumping position to dump its contents into the wagon body and in any position the carrying arms may be in at the time to distribute the contents of the scoop during repeated operations evenly in the wagon body, a motor for propelling the truck and provided with a transmission gear, connections between the said transmission gear and the said power driven actuating devices to actuate the latter, and independent controlling devices under the control of an operator and connected with the said connections.

5. In a self-loading and dumping auto-truck, the combination of a truck, a wagon body mounted to swing on the said truck, carrying arms mounted to swing on the said truck and carrying a scoop adapted to dump its contents into the said wagon body, and actuating means mounted on the truck and connected with the said wagon body and the said carrying arms to swing the carrying arms forwardly from rearward dumping position at the same time swinging the wagon body upwardly into dumping position.

6. In a self-loading and dumping auto-truck, the combination of a power driven truck, carrying arms mounted to swing up and down on the said truck, a scoop mounted to swing on the said carrying arms, a power driven actuating mechanism mounted on the truck and connected with the said scoop to impart a swinging motion to the latter, a power driven actuating mechanism connected with the said carrying arms to impart a swinging movement to the said carrying arms wholly independent of the swinging movement given to the said scoop, indicating means having pointers and a dial on which the pointers indicate, and connecting means connecting the said pointers with the said actuating mechanisms of the carrying arms and the scoop to actuate the said pointers, the latter indicating the positions of the said carrying arms and scoop.

7. In a self-loading and dumping auto-truck, the combination of an auto-truck having a driver's seat, a wagon body mounted to swing up and down on the truck in the rear of the driver's seat, a scoop, carrying arms carrying the said scoop and mounted to swing on the said truck to carry the scoop overhead of the driver's seat and into dumping relation with the said wagon body, and reflecting observation means mounted on the said driver's seat to enable the driver to observe the positions of the scoop and carrying arms when in dumping positions.

8. In a self-loading and dumping auto-truck, the combination of an auto-truck having a driver's seat, a wagon body mounted to swing up and down on the truck in the rear of the driver's seat, a scoop, carrying arms carrying the said scoop and mounted to swing on the said truck to carry the scoop overhead of the driver's seat and into dumping relation with the said wagon body, a tube on top of the driver's seat, a mirror mounted to swing on the said tube to open and close the latter, and manually controlled means connected with the said mirror and within reach of the driver to enable the latter to swing the mirror upward into observation position.

JOHN A. WARD.